(12) United States Patent
Sato

(10) Patent No.: US 9,363,402 B1
(45) Date of Patent: Jun. 7, 2016

(54) INFORMATION PROCESSING APPARATUS

(71) Applicant: FUJI XEROX CO., LTD., Tokyo (JP)

(72) Inventor: Jun Sato, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/715,067

(22) Filed: May 18, 2015

(30) Foreign Application Priority Data

Nov. 27, 2014 (JP) ................. 2014-240073

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC ....... *H04N 1/00891* (2013.01); *H04N 1/00204* (2013.01); *H04N 1/00795* (2013.01); *H04N 1/00896* (2013.01); *H04N 2201/0081* (2013.01)

(58) Field of Classification Search
USPC .................................. 358/1.1–1.18
See application file for complete search history.

(56) References Cited

U.S. PATENT DOCUMENTS 8,537,146 B1 * 9/2013 Nicklisch et al. ............. 345/204
8,855,799 B2 * 10/2014 Chen .............................. 700/96

FOREIGN PATENT DOCUMENTS

JP       2013-223173 A    10/2013

* cited by examiner

*Primary Examiner* — Douglas Tran
(74) *Attorney, Agent, or Firm* — Sughrue Mion, PLLC

(57) ABSTRACT

An information processing apparatus includes a first processing unit, a second processing unit, a response processing unit, and a selection unit. The first and second processing units perform, in a first state, a predetermined process on data received via first and second communication interfaces respectively and do not perform the process in a second state. The response processing unit performs a response process in place of the first or second processing unit on the data received via the first or second communication interface when the first and second processing units are in the second state. The selection unit selects the second processing unit as a transmission destination of the data received via the second communication interface when the second processing unit is in the first state, and selects the response processing unit as the transmission destination when the second processing unit is in the second state.

7 Claims, 14 Drawing Sheets

FIG. 5

| IDENTIFICATION NUMBER | PROTOCOL | IP ADDRESS | PORT NUMBER | OPERATION OF LSI |
|---|---|---|---|---|
| 1 | ARP | A.A.A.A | - | AUTOMATIC RESPONSE |
| 2 | ARP | B.B.B.B | - | RETURN-FROM-POWER-SAVING OPERATION |
| 3 | TCP | A.A.A.A | 515 | RETURN-FROM-POWER-SAVING OPERATION |
| 4 | TCP | B.B.B.B | 515 | RETURN-FROM-POWER-SAVING OPERATION |
| 5 | TCP | A.A.A.A | OTHER | DISCARD |
| 6 | TCP | B.B.B.B | OTHER | DISCARD |
| 7 | ICMP | A.A.A.A | - | RETURN-FROM-POWER-SAVING OPERATION |
| 8 | ICMP | B.B.B.B | - | RETURN-FROM-POWER-SAVING OPERATION |
| 9 | UDP | A.A.A.A | 161 | RETURN-FROM-POWER-SAVING OPERATION |
| 10 | UDP | B.B.B.B | 161 | RETURN-FROM-POWER-SAVING OPERATION |
| 11 | UDP | A.A.A.255 | 161 | RETURN-FROM-POWER-SAVING OPERATION |
| 12 | UDP | B.B.B.255 | 161 | RETURN-FROM-POWER-SAVING OPERATION |

INFORMATION PROCESSING APPARATUS

CROSS-REFERENCE TO RELATED APPLICATIONS

This application is based on and claims priority under 35 USC 119 from Japanese Patent Application No. 2014-240073 filed Nov. 27, 2014.

BACKGROUND (i) Technical Field

The present invention relates to an information processing apparatus.

(ii) Related Art

A technique for reducing power consumption in network communication has been proposed.

A standby response large scale integration chip (LSI) is available that, in a case where an information processing apparatus that includes a communication interface connected to a communication line and a processor that processes data received via the communication interface is in a power saving state, reduces the power of the processor or cuts power supply to the processor, and processes received data in place of the processor in order to reduce the power consumption of the information processing apparatus. An apparatus that includes plural communication interfaces which correspond to various types or uses of communication lines is desired. In a case where plural communication interfaces are provided to an information processing apparatus, it is expected that standby response LSIs need to be provided to the respective plural communication interfaces in order to support a power saving state.

SUMMARY

According to an aspect of the invention, there is provided an information processing apparatus including a first processing unit, a second processing unit, a response processing unit, and a selection unit. The first processing unit performs, in a first state, a predetermined process on data received via a first communication interface and does not perform the process in a second state. The second processing unit performs, in the first state, a predetermined process on data received via a second communication interface and does not perform the process in the second state. The response processing unit performs a response process in place of the first processing unit on the data received via the first communication interface or in place of the second processing unit on the data received via the second communication interface in a case where the first processing unit and the second processing unit are in the second state. The selection unit selects the second processing unit as a transmission destination of the data received via the second communication interface in a case where the second processing unit is in the first state, and selects the response processing unit as the transmission destination of the data in a case where the second processing unit is in the second state.

BRIEF DESCRIPTION OF THE DRAWINGS

An exemplary embodiment of the present invention will be described in detail based on the following figures, wherein:

FIG. 5 is a diagram illustrating an example of correspondence information;

DETAILED DESCRIPTION

Figure 1:
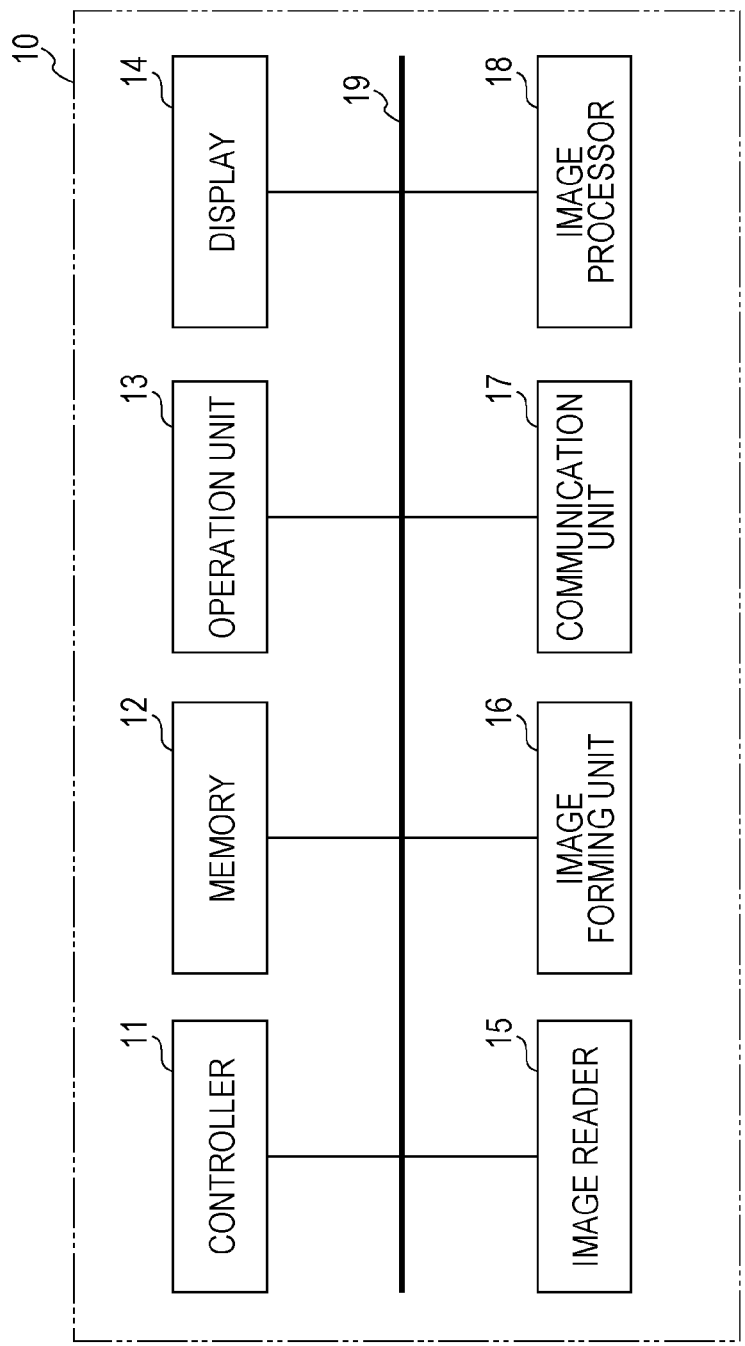
FIG. 1 is a block diagram illustrating a hardware configuration of an image forming apparatus.

FIG. 1 is a block diagram illustrating a hardware configuration of an image forming apparatus 10. As illustrated in FIG. 1, the image forming apparatus 10 includes a controller 11, a memory 12, an operation unit 13, a display 14, an image reader 15, an image forming unit 16, a communication unit 17, and an image processor 18. The units in the image forming apparatus 10 are connected to a bus 19 and exchange various types of data via the bus 19.

The controller 11 is a unit that controls operations of the units in the image forming apparatus 10. The controller 11 includes an arithmetic processing unit, such as a central processing unit (CPU), and a storage medium (main storage device), such as a read-only memory (ROM), a random access memory (RAM), and so on. The CPU (a CPU 110 described below) reads programs stored in the ROM and in the memory 12 and executes the programs by using the RAM as a work area. The controller 11 executes the programs in this way to thereby implement functions of forming an image on a sheet, generating image data by reading an image of a document, communicating with other apparatuses via communication lines, and so on.

The memory 12 is a unit that stores data. The memory 12 includes a storage medium (auxiliary storage device), such as a hard disk, a flash memory, and so on, and stores data received by the communication unit 17, data generated by the image forming apparatus 10, and the like. The memory 12 may include a detachable storage medium (removable medium), such as a memory card or a Universal Serial Bus (USB) memory, and a unit that reads/writes data from/to the storage medium. The memory 12 stores a control program described below.

The operation unit 13 is a unit that accepts user operations. The operation unit 13 includes operation pieces (buttons, keys, and so on) and feeds a control signal corresponding to a pressed operation piece to the controller 11. The operation unit 13 may be constituted by a touch panel that includes the display 14 and a sensor stacked on the display surface of the display 14 and that feeds a control signal corresponding to a pressed position to the controller 11.

The display 14 is a unit that displays information. The display 14 includes a liquid crystal display as a display device, for example. The display 14 displays a menu screen for operating the image forming apparatus 10 under control of the controller 11.

The image reader 15 is a unit that reads an image of a document and converts the image into image data. The image reader 15 includes an image reading device that optically reads an image of a document, and generates image data that represents the read image of the document. The image reader 15 feeds the generated image data to the image processor 18.

The image forming unit 16 is a unit that forms an image on a sheet. The image forming unit 16 includes an image forming mechanism for forming a toner image having the CMYK color components on a sheet using an electrophotographic method. Note that the image forming mechanism may use other recording methods, such as an inkjet method, instead of an electrophotographic method.

The communication unit 17 is a unit that transmits and receives data. The communication unit 17 is connected to a communication line and functions as a communication interface (hereinafter referred to as "communication IF") for performing wired or wireless communication with external apparatuses. In the exemplary embodiment of the present invention, the communication unit 17 functions as plural communication IFs. The configuration and operations of the communication unit 17 will be specifically described below.

The image processor 18 is a unit that performs image processing on image data. Image processing described here includes color correction and tone correction, for example. In a case where a print function is executed in the image forming apparatus 10, the image processor 18 feeds image data on which image processing has been performed to the image forming unit 16.

Figure 2:
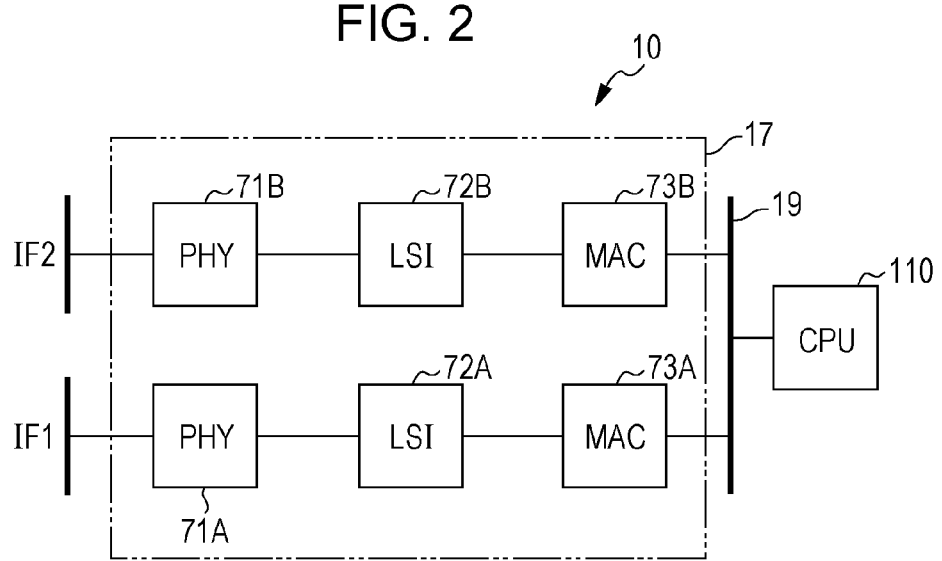
FIG. 2 is a diagram illustrating a hardware configuration of a communication unit according to a comparative example.

FIG. 2 is a diagram illustrating a hardware configuration of the communication unit 17 according to a comparative example. In this example, the communication unit 17 includes two PHYs (physical layer units) 71 (71A and 71B), two LSIs 72 (72A and 72B), and two MACs (media access controllers) 73 (73A and 73B). The PHY 71 specifies a physical scheme relating to network connection and data transmission in the physical layer of the Open Systems Interconnection (OSI) reference model. In FIG. 2, the PHY 71A functions as a first communication IF (hereinafter referred to as "communication IF 1"), and the PHY 71B functions as a second communication IF (hereinafter referred to as "communication IF 2"). The communication IF 1 and the communication IF 2 are respectively connected to different communication lines. Specifically, one of the communication IF 1 and the communication IF 2 is connected to the Internet, and the other is connected to a local area network (LAN), such as an intranet, for example. The communication IF 1 and the communication IF 2 are respectively connected to communication lines of different groups (departments, sections, or the like), for example. Note that the communication IF 1 and the communication IF 2 may be based on a wired or a wireless communication scheme. The MAC 73 specifies a frame (unit of data transmission/reception) transmission/reception method, a frame format, an error detection method, and so on in the data link layer of the OSI reference model, and performs a predetermined process on a packet (an example of a data unit) received via the communication IF.

Operations of the MAC 73 are controlled by the CPU 110 of the controller 11. In this example, the operation state of the MAC 73 includes a normal state (an example of a first state) and a power saving state (an example of a second state). The power saving state is a state where the power consumption is relatively low compared to the normal state. In the normal state, power needed for normal processing operations is supplied to the MAC 73, and therefore, the MAC 73 is able to process packets received via the communication IF. In the power saving state, part or none of the power is supplied to the MAC 73, and therefore, the power saving state is a state where the MAC 73 is unable to process packets. In a case where a predetermined condition (hereinafter referred to as "power saving condition") is satisfied, such as in a case where a predetermined packet is not received via the communication IF 1 and via the communication IF 2 for a period longer than a predetermined period or in a case where any operation instruction is not provided to the image forming apparatus 10 for a period longer than a predetermined period, the CPU 110 changes the operation states of the MACs 73 from the normal state to the power saving state. Specifically, the CPU 110 changes the operation states of the MACs 73 from a state where power needed for normal operations is supplied to the MACs 73 to a state where part or none of the power is supplied to the MACs 73. Hereinafter, a case where both of the MAC 73A and the MAC 73B are in the power saving state will be described as a case where the communication unit 17 is in the power saving state. In a case where the CPU 110 changes the operation states of the MACs 73 from the normal state to the power saving state, the CPU 110 also changes its operation state from the normal state to the power saving state. Specifically, the CPU 110 changes its operation state from a state where power needed for normal operations is supplied to the CPU 110 to a state where part or none of the power is supplied to the CPU 110. The CPU 110 controls operations of the MACs 73 in a case where the CPU 110 is in the normal state.

The LSI 72 is a so-called standby response LSI that processes packets received via the communication IF in place of the CPU 110 and the MAC 73 that are in the power saving state. The LSI 72 is provided between the PHY 71 and the MAC 73, for example, in order to reduce power consumption of the CPU 110 and the MAC 73. The LSI 72 makes a response to a packet that satisfies a predetermined condition among packets received via the communication IF, in place of the CPU 110 and the MAC 73. In the example illustrated in FIG. 2, the LSI 72A makes a response to a packet that satisfies a predetermined condition among packets received via the communication IF 1 in a case where the CPU 110 and the MAC 73 are in the power saving state. The LSI 72B makes a response to a packet that satisfies a predetermined condition among packets received via the communication IF 2 in the case where the CPU 110 and the MAC 73 are in the power saving state.

In the example illustrated in FIG. 2, the LSI 72A and the LSI 72B are respectively provided to the communication IF 1 and the communication IF 2. As described above, the LSI 72 is provided in order to reduce the power consumption of the CPU 110 and the MAC 73; however, the LSI 72 itself consumes power. Accordingly, if the LSI 72 is provided to each communication IF, the total power consumption of the communication unit 17 in the power saving state increases in proportion to the number of communication IFs. The image forming apparatus 10 according to the exemplary embodiment of the present invention reduces power consumption in the power saving state by providing a common LSI 72 to plural communication IFs.

Figure 3:
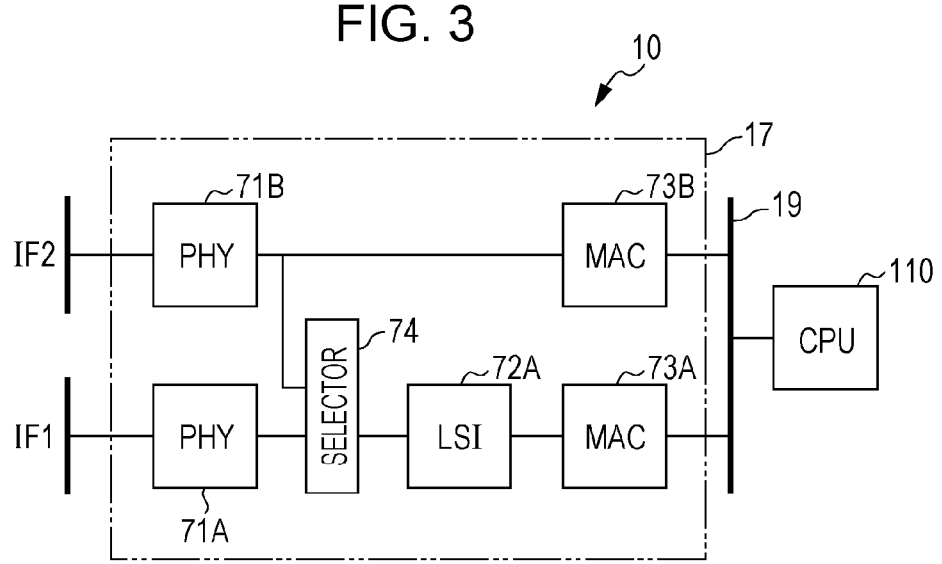
FIG. 3 is a diagram illustrating a hardware configuration of the communication unit according to an exemplary embodiment of the present invention.

FIG. 3 is a diagram illustrating a hardware configuration of the communication unit 17 according to the exemplary embodiment of the present invention. In FIG. 3, the communication unit 17 includes the two PHYs 71 (71A and 71B), the LSI 72A, the two MACs 73 (73A and 73B), and a selector 74. In FIG. 3, the PHYs 71 and the MACs 73 function similarly as in FIG. 2.

The selector 74 is a circuit that selects a transmission destination of a packet received via the communication IF 1 or of a packet received via the communication IF 2. The selector 74 separately receives a packet received by the PHY 71A and a packet received by the PHY 71B. In a case where the MAC 73B that is subsequent to the PHY 71B is in the power saving state, the selector 74 outputs a packet received by the PHY 71A and a packet received by the PHY 71B to the LSI 72A. In a case where the MAC 73B is in the normal state, the selector 74 outputs only a packet received by the PHY 71A to the LSI 72A. Operations of the selector 74 are controlled by the CPU 110 in conjunction with the CPU 110 controlling the operation state of the MAC 73B. Specifically, the CPU 110 and the selector 74 are connected to each other via a signal line not illustrated, and, when the CPU 110 has changed the operation state of the MAC 73B from the normal state to the power saving state, the CPU 110 notifies the selector 74 that the MAC 73B has transitioned to the power saving state. After the selector 74 has received the notification from the CPU 110, the selector 74 receives a packet received by the PHY 71A and a packet received by the PHY 71B. When the CPU 110 has changed the operation state of the MAC 73B from the power saving state to the normal state, the CPU 110 notifies the selector 74 that the MAC 73B has transitioned to the normal state. After the selector 74 has received the notification from the CPU 110, the selector 74 receives only a packet received by the PHY 71A.

Figure 4A:
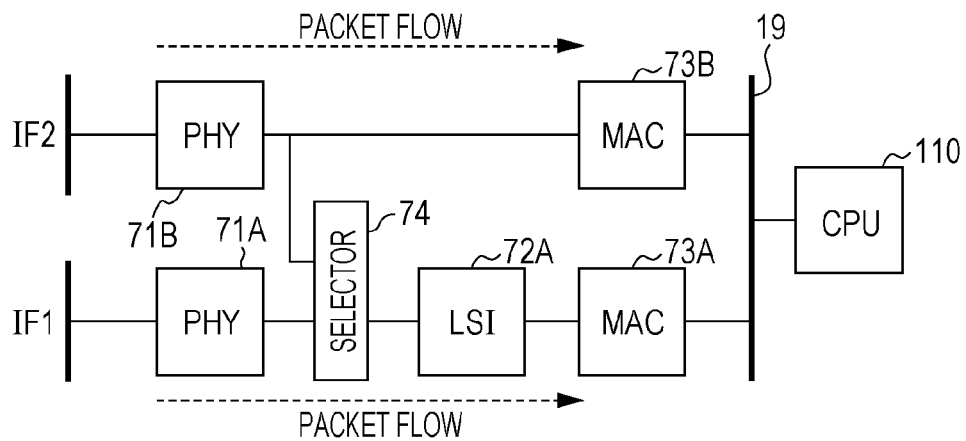
FIG. 4A is a diagram for describing flows of received packets.
Figure 4B:
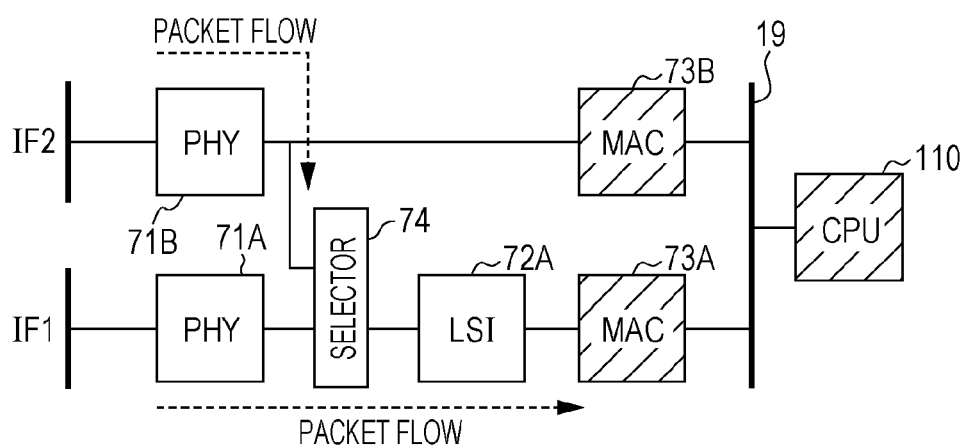
FIG. 4B is a diagram for describing flows of received packets.

FIGS. 4A and 4B are diagrams for describing flows of packets received via the communication IF 1 and via the communication IF 2. FIG. 4A illustrates flows of packets in a case where the CPU 110, the MAC 73A, and the MAC 73B are in the normal state. FIG. 4B illustrates flows of packets in a case where the CPU 110, the MAC 73A, and the MAC 73B are in the power saving state. Note that the shaded portions in FIG. 4B (and in FIGS. 6 to 8, FIG. 13A, FIGS. 16B and 16C, and FIGS. 17A and 17B described below) each indicate a portion that is in the power saving state. As illustrated in FIGS. 4A and 4B, a packet received via the communication IF 1 is input into the LSI 72A via the selector 74 regardless of the operation states of the CPU 110 and the MACs 73. A packet received via the communication IF 2 is input into the MAC 73B in a case where the MAC 73B is in the normal state (FIG. 4A), and is input into the LSI 72A via the selector 74 in a case where the MAC 73B is in the power saving state (FIG. 4B). As illustrated in FIGS. 4A and 4B, the selector 74 has a function of selecting the transmission destination of a packet received via the communication IF 2. Specifically, the selector 74 selects the MAC 73B as the transmission destination of a packet received via the communication IF 2 in the case where the MAC 73B is in the normal state, and selects the LSI 72A as the transmission destination of a packet received via the communication IF 2 in the case where the MAC 73B is in the power saving state. The transmission destination of a packet received via the communication IF 1 is always the LSI 72A.

Referring back to FIG. 3, the LSI 72A operates either in a pass-through mode or in a standby response mode. The pass-through mode is a mode where the LSI 72A outputs a packet received from the previous circuit (selector 74) to the subsequent circuit (MAC 73A). The standby response mode is a mode where the LSI 72A does not output a received packet to the subsequent circuit, and performs a predetermined process on the packet. The process performed in the standby response mode will be described in detail below. Switching between the pass-through mode and the standby response mode is performed by the CPU 110. The CPU 110 switches the operation mode of the LSI 72A from the pass-through mode to the standby response mode in a case where the operation state thereof changes from the normal state to the power saving state, and switches the operation mode of the LSI 72A from the standby response mode to the pass-through mode in a case where the operation state thereof changes from the power saving state to the normal state.

In the standby response mode, the LSI 72A performs any of the following operations (a) to (c) when receiving a packet from the selector 74.

(a) The LSI 72A makes a response to a received packet by itself.

The LSI 72A makes a response to a received packet for which the operation state of the CPU 110 need not be changed from the power saving state to the normal state (for which the power saving state need not be cancelled), that is, makes a response to a received packet for which processes need not be performed by the CPU 110 and the MAC 73A. The LSI 72A makes a response by transmitting a response packet to an external apparatus that is the transmission source of the received packet. Hereinafter, the operation (a) is referred to as "automatic response".

(b) The LSI 72A discards a received packet.

The LSI 72A discards a received packet for which the power saving state of the CPU 110 need not be cancelled and for which an automatic response need not be made.

(c) The LSI 72A cancels the power saving state of the CPU 110.

The LSI 72A cancels the power saving state of the CPU 110 when receiving a packet for which the power saving state of the CPU 110 need to be cancelled (that is, a packet for which processes need to be performed by the CPU 110 and the MAC 73A). Hereinafter, the operation (c) is referred to as "return-from-power-saving operation". The return-from-power-saving operation will be described in detail below.

A decision as to which of the above-described operations (a) to (c) is to be performed is made in accordance with attributes of the packet, such as the protocol and the destination of the packet, for example. In the memory area of the LSI 72A, information (hereinafter referred to as "correspondence information") is stored in advance that indicates a correspondence between the protocol of each packet and the destination of the packet, and an operation to be performed by the LSI 72A. When the LSI 72A has received a packet in the standby response mode, the LSI 72A analyzes the protocol of the packet and the destination of the packet and performs any of the above-described operations (a) to (c) in accordance with the correspondence information.

FIG. 5 is a diagram illustrating an example of the correspondence information. The LSI 72A performs a different operation in accordance with the combination of the protocol of the packet and the destination of the packet (the Internet Protocol (IP) address and the port number). Note that, in FIG. 5, IP addresses are expressed in a simplified format for convenience sake. In the example, the IP addresses "A.A.A.A" and "A.A.A.255" indicate that the packets are destined for the MAC 73A, and the IP addresses "B.B.B.B" and "B.B.B.255" indicate that the packets are destined for the MAC 73B. That is, the correspondence information indicates operations to be performed by the LSI 72A for a packet destined for the MAC 73A and for a packet destined for the MAC 73B. In FIG. 5, in a case where the protocol of a received packet is Address Resolution Protocol (ARP), and the IP address is "A.A.A.A", for example, the LSI 72A makes an automatic response to the packet. In a case where the protocol of a received packet is Transmission Control Protocol (TCP), the IP address is "B.B.B.B", and the port number is "515", for example, the LSI 72A performs a return-from-power-saving operation. In a case where the protocol of a received packet is TCP, the IP address is "B.B.B.B", and the port number is a number other than "515" and "161" (Other), for example, the LSI 72A discards the packet. In FIG. 5, "identification number" is a number used to identify each record included in the correspondence information. The LSI 72A stores, in the memory area, the identification number of a record that has been referred to in order to process a packet in the standby response mode. In the memory area, the identification number of a record that has been last referred to is stored.

Figure 6:
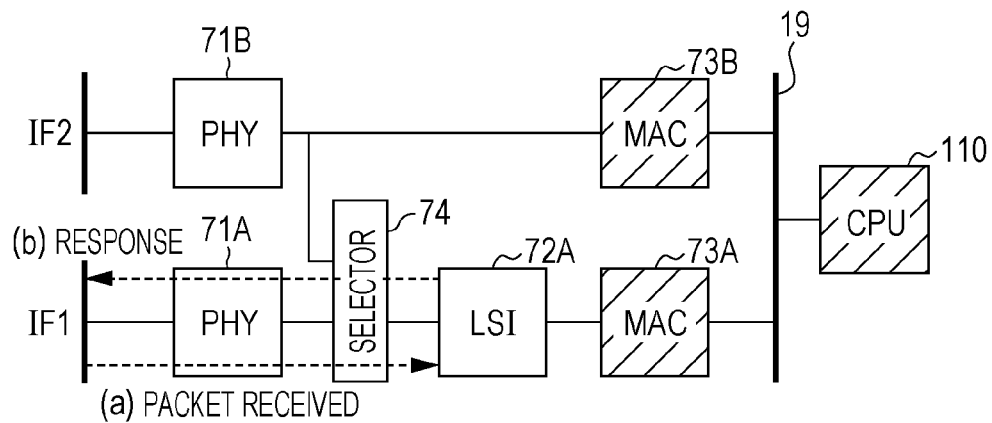
FIG. 6 is a diagram illustrating an LSI making an automatic response.

FIG. 6 is a diagram illustrating a case where the communication unit 17 is in the power saving state, and the LSI 72A makes an automatic response to a packet when the LSI 72A is in the standby response mode. In FIG. 6, a packet is received via the communication IF 1, and the LSI 72A makes a response to the packet via the communication IF 1 ((a) and (b) in FIG. 6).

Figure 7:
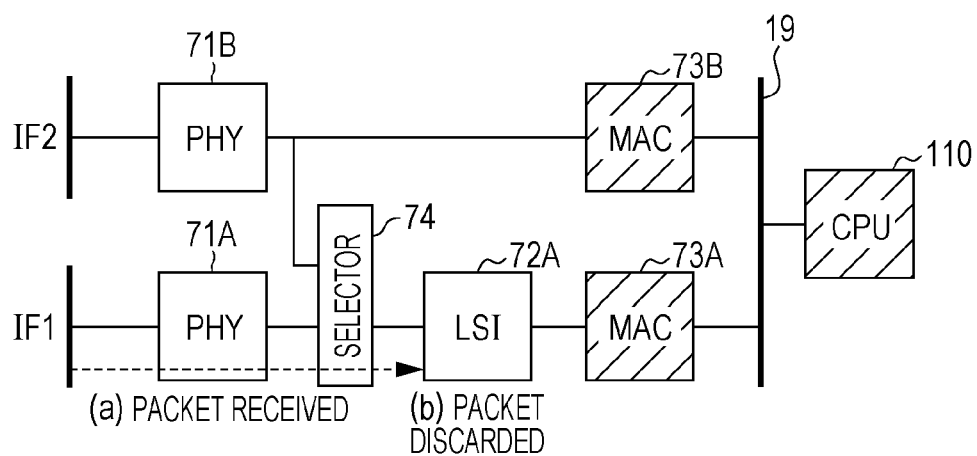
FIG. 7 is a diagram illustrating the LSI discarding a packet.

FIG. 7 is a diagram illustrating a case where the communication unit 17 is in the power saving state, and the LSI 72A discards a packet when the LSI 72A is in the standby response mode. In FIG. 7, a packet is received via the communication IF 1, and the LSI 72A discards the packet ((a) and (b) in FIG. 7). A packet received via the communication IF 2 is also discarded.

Figure 8:
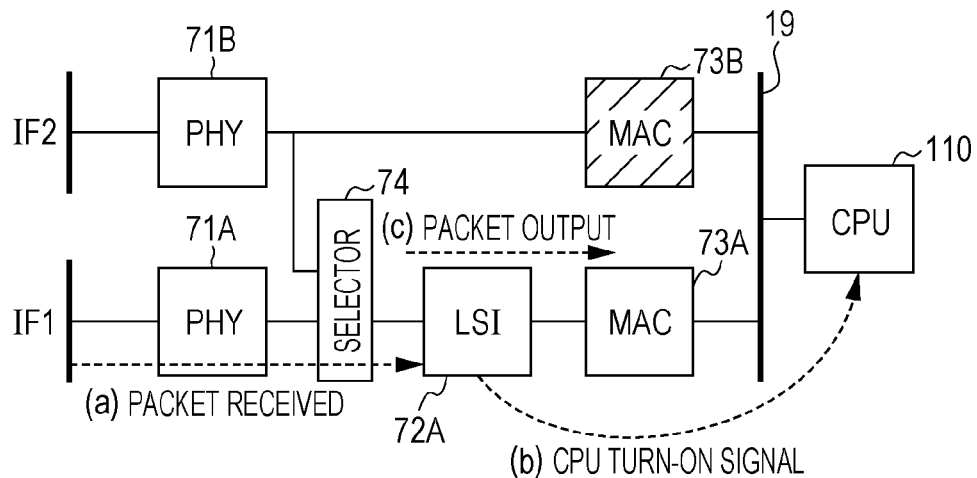
FIG. 8 is a diagram for describing operations of units when a return-from-power-saving operation is performed.

FIG. 8 is a diagram for describing operations of the units of the image forming apparatus 10 in a case where the communication unit 17 is in the power saving state, and the LSI 72A performs a return-from-power-saving operation when the LSI 72A is in the standby response mode. FIG. 8 illustrates a case where the power saving states of the CPU 110 and the MAC 73A are cancelled when a packet destined for the MAC 73A is received via the communication IF 1. As illustrated in FIG. 8, when the LSI 72A has received a packet for which the power saving state of the CPU 110 need to be cancelled ((a) in FIG. 8), the LSI 72A stores the packet in the memory area, and outputs a signal (hereinafter referred to as "CPU turn-on signal") for cancelling the power saving states of the CPU 110 and the MAC 73A to the CPU 110 ((b) in FIG. 8). When the CPU 110 has received the CPU turn-on signal from the LSI 72A, the CPU 110 changes its operation state from the power saving state to the normal state. After the CPU 110 has transitioned to the normal state, the CPU 110 changes the operation state of the MAC 73A from the power saving state to the normal state. In this case, the CPU 110 leaves the operation state of the MAC 73B in the power saving state. After the CPU 110 has changed the operation state of the MAC 73A from the power saving state to the normal state, the CPU 110 switches the operation mode of the LSI 72A from the standby response mode to the pass-through mode. After the LSI 72A has been switched to the pass-through mode, the LSI 72A outputs the packet to the MAC 73A ((c) in FIG. 8). When the MAC 73A has received the packet from the LSI 72A, the MAC 73A processes the packet.

Figure 9:
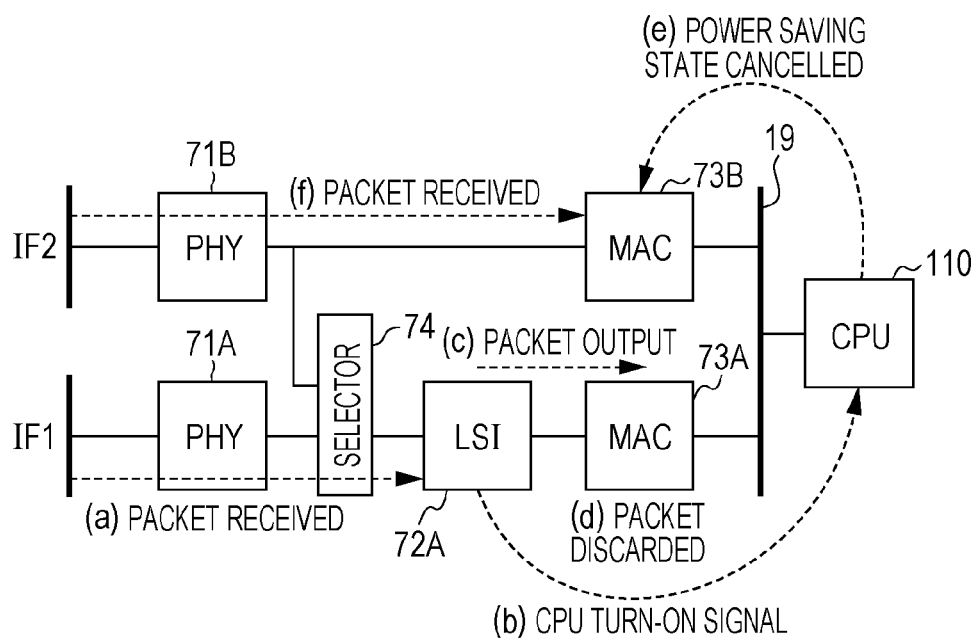
FIG. 9 is another diagram for describing operations of the units when a return-from-power-saving operation is performed.

FIG. 9 is another diagram for describing operations of the units of the image forming apparatus 10 in a case where the communication unit 17 is in the power saving state, and the LSI 72A performs a return-from-power-saving operation when the LSI 72A is in the standby response mode. FIG. 9 illustrates operations of the units when a packet destined for the MAC 73B is received via the communication IF 2, and the operations are different from those illustrated in FIG. 8 in that the power saving state of the MAC 73B is also cancelled in addition to those of the CPU 110 and the MAC 73A. In FIG. 9, a process similar to that in FIG. 8 is performed, and the LSI 72A that has been switched to the pass-through mode outputs a received packet to the MAC 73A ((a) to (c) in FIG. 9). If the MAC 73A determines that the received packet is not a packet destined for the MAC 73A, the MAC 73A discards the packet ((d) in FIG. 9). The MAC 73A outputs a signal (hereinafter referred to as "packet discard signal") indicating that the packet has been discarded to the CPU 110. When the CPU 110 has received the packet discard signal, the CPU 110 reads the identification number and the correspondence information stored in the memory area of the LSI 72A. The CPU 110 identifies the destination of the packet discarded by the MAC 73A on the basis of the identification information and the correspondence information that have been read. In this example, the CPU 110 identifies the destination of the packet discarded by the MAC 73A as the MAC 73B. The CPU 110 changes the operation state of the MAC 73B that has been identified as the destination from the power saving state to the normal state ((e) in FIG. 9). After the MAC 73B has transitioned to the normal state, the MAC 73B waits for a packet that is identical to the discarded packet and that is destined for the MAC 73B to be retransmitted from an external apparatus. When the MAC 73B has received a retransmitted packet destined for the MAC 73B ((f) in FIG. 9), the MAC 73B processes the packet.

Figure 10A:
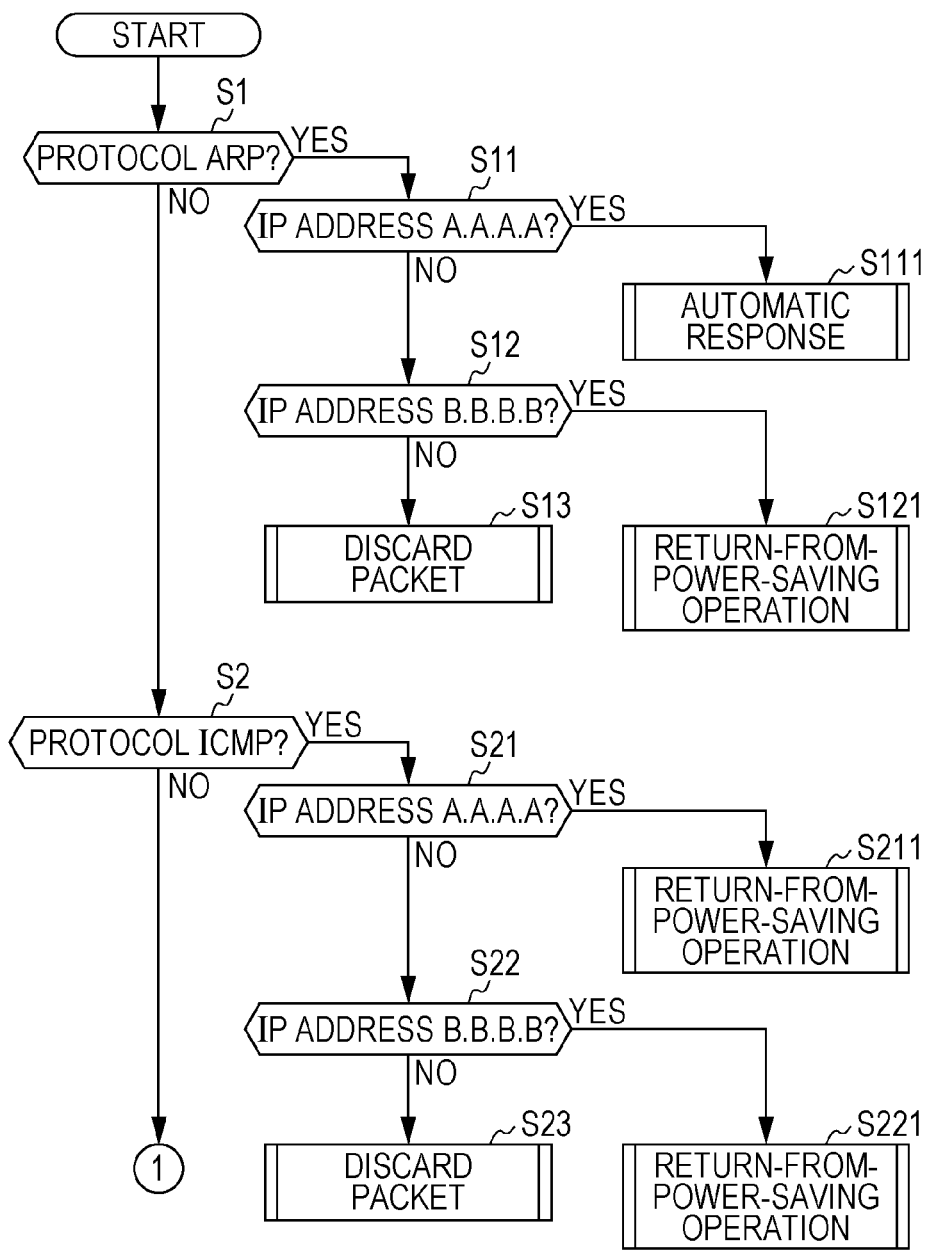
FIG. 10A is a flowchart illustrating a process performed by the LSI in a standby response mode.
Figure 10B:
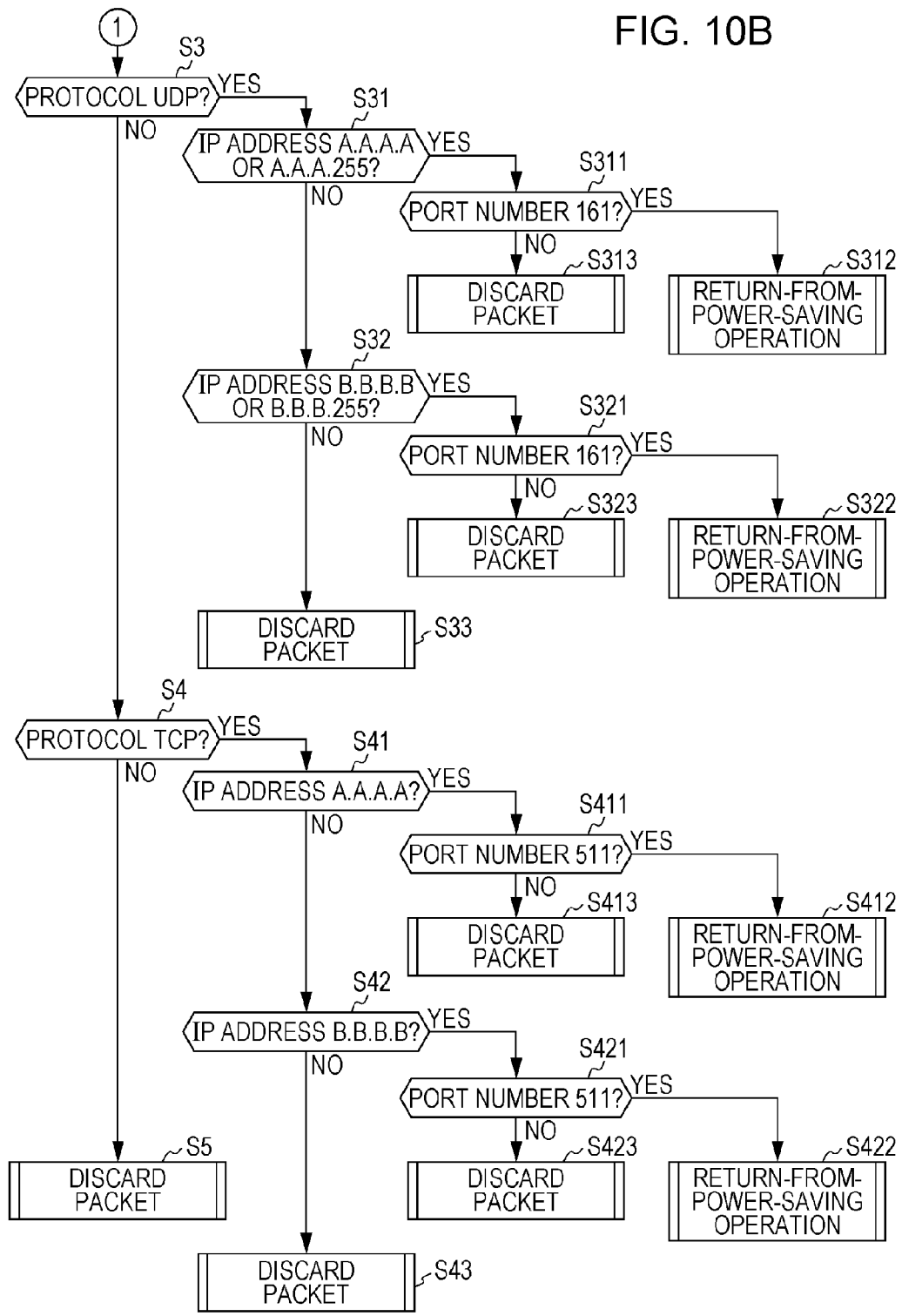
FIG. 10B is a flowchart illustrating a process performed by the LSI in the standby response mode.

FIGS. 10A and 10B are flowcharts illustrating a process performed by the LSI 72A in the standby response mode when the communication unit 17 is in the power saving state. FIGS. 10A and 10B illustrate a process while assuming that the correspondence information illustrated in FIG. 5 is stored in the memory area of the LSI 72A. In step S1, if the LSI 72A determines that the protocol of a received packet is ARP (Yes in step S1), the flow proceeds to step S11, and, if the LSI 72A determines that the protocol of the received packet is not ARP (No in step S1), the flow proceeds to step S2.

In step S11, if the LSI 72A determines that the IP address is "A.A.A.A" (Yes in step S11), the LSI 72A makes an automatic response to the received packet (step S111), and, if the LSI 72A determines that the IP address is not "A.A.A.A" (No in step S11), the flow proceeds to step S12. In step S12, if the LSI 72A determines that the IP address is "B.B.B.B" (Yes in step S12), the LSI 72A performs a return-from-power-saving operation (step S121). In this case, the operations illustrated in FIG. 9 are performed. If the LSI 72A determines that the IP address is not "B.B.B.B" (No in step S12), the LSI 72A discards the received packet (step S13).

In step S2, if the LSI 72A determines that the protocol of the received packet is Internet Control Message Protocol (ICMP) (Yes in step S2), the flow proceeds to step S21, and, if the LSI 72A determines that the protocol of the received packet is not ICMP (No in step S2), the flow proceeds to step S3.

In step S21, if the LSI 72A determines that the IP address is "A.A.A.A" (Yes in step S21), the LSI 72A performs a return-from-power-saving operation (step S211). In this case, the operations illustrated in FIG. 8 are performed. If the LSI 72A determines that the IP address is not "A.A.A.A" (No in step S21), the flow proceeds to step S22. In step S22, if the LSI 72A determines that the IP address is "B.B.B.B" (Yes in step S22), the LSI 72A performs a return-from-power-saving operation (step S221). In this case, the operations illustrated in FIG. 9 are performed. If the LSI 72A determines that the IP address is not "B.B.B.B" (No in step S22), the LSI 72A discards the received packet (step S23).

In step S3, if the LSI 72A determines that the protocol of the received packet is User Datagram Protocol (UDP) (Yes in step S3), the flow proceeds to step S31, and, if the LSI 72A determines that the protocol of the received packet is not UDP (No in step S3), the flow proceeds to step S4.

In step S31, if the LSI 72A determines that the IP address is either "A.A.A.A" or "A.A.A.255" (Yes in step S31), the flow proceeds to step S311. If the LSI 72A determines that the IP address is neither "A.A.A.A" nor "A.A.A.255" (No in step S31), the flow proceeds to step S32.

In step S311, if the LSI 72A determines that the port number is "161" (Yes in step S311), the LSI 72A performs a return-from-power-saving operation (step S312). In this case, the operations illustrated in FIG. 8 are performed. If the LSI 72A determines that the port number is not "161" (No in step S311), the LSI 72A discards the received packet (step S313).

In step S32, if the LSI 72A determines that the IP address is either "B.B.B.B" or "B.B.B.255" (Yes in step S32), the flow proceeds to step S321. If the LSI 72A determines that the IP address is neither "B.B.B.B" nor "B.B.B.255" (No in step S32), the LSI 72A discards the received packet (step S33).

In step S321, if the LSI 72A determines that the port number is "161" (Yes in step S321), the LSI 72A performs a return-from-power-saving operation (step S322). In this case, the operations illustrated in FIG. 9 are performed. If the LSI 72A determines that the port number is not "161" (No in step S321), the LSI 72A discards the received packet (step S323).

In step S4, if the LSI 72A determines that the protocol of the received packet is TCP (Yes in step S4), the flow proceeds to step S41, and, if the LSI 72A determines that the protocol of the received packet is not TCP (No in step S4), the LSI 72A discards the received packet (step S5).

In step S41, if the LSI 72A determines that the IP address is "A.A.A.A" (Yes in step S41), the flow proceeds to step S411. If the LSI 72A determines that the IP address is not "A.A.A.A" (No in step S41), the flow proceeds to step S42.

In step S411, if the LSI 72A determines that the port number is "515" (Yes in step S411), the LSI 72A performs a return-from-power-saving operation (step S412). In this case, the operations illustrated in FIG. 8 are performed. If the LSI 72A determines that the port number is not "515" (No in step S411), the LSI 72A discards the received packet (step S413).

In step S42, if the LSI 72A determines that the IP address is "B.B.B.B" (Yes in step S42), the flow proceeds to step S421. If the LSI 72A determines that the IP address is not "B.B.B.B" (No in step S42), the LSI 72A discards the received packet (step S43).

In step S421, if the LSI 72A determines that the port number is "515" (Yes in step S421), the LSI 72A performs a return-from-power-saving operation (step S422). In this case, the operations illustrated in FIG. 9 are performed. If the LSI 72A determines that the port number is not "515" (No in step S421), the LSI 72A discards the received packet (step S423).

As described above, in the image forming apparatus 10 according to the exemplary embodiment of the present invention, the operation states of the MAC 73A and the MAC 73B are controlled without providing the LSIs 72 respectively to the communication IF 1 and the communication IF 2. Therefore, the power consumption of the LSI 72 when the communication unit 17 is in the power saving state is reduced compared to a case where the LSIs 72 are respectively provided to plural communication IFs. Note that, in the configuration illustrated in FIG. 3, it is desired that the communication IF 1 be connected to one of the two communication lines that are to be connected to the communication IF 1 and the communication IF 2, the one of the two communication lines having a higher communication frequency than the other. In doing so, the LSI 72A makes automatic responses to packets more frequently than in a case where the communication line having a higher communication frequency is connected to the communication IF 2, which attains a stronger power saving effect on the image forming apparatus 10 as a whole when the communication unit 17 is in the power saving state.

Figure 11:
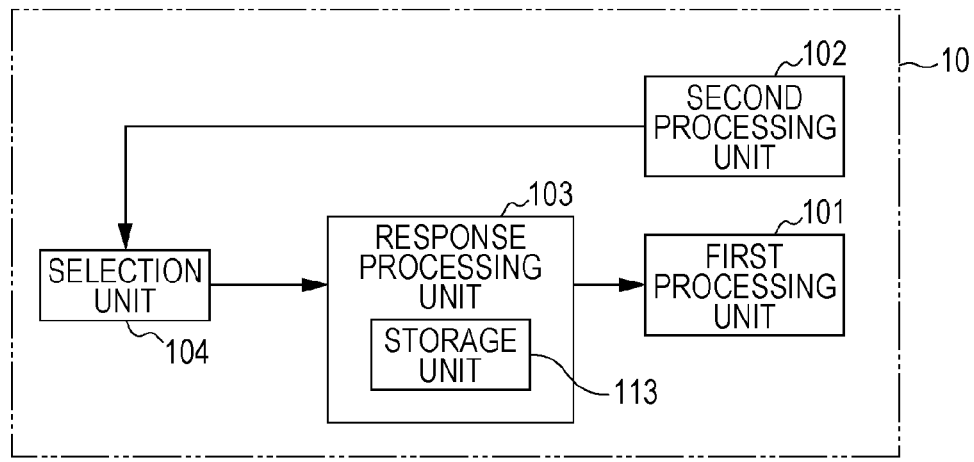
FIG. 11 is a block diagram illustrating a functional configuration of the image forming apparatus.

FIG. 11 is a block diagram illustrating a functional configuration of the image forming apparatus 10. The image forming apparatus 10 includes a first processing unit 101, a second processing unit 102, a response processing unit 103, and a selection unit 104. The first processing unit 101 performs, in the normal state, a predetermined process on a packet received via the communication IF 1, and does not perform the process in the power saving state. The second processing unit 102 performs, in the normal state, a predetermined process on a packet received via the communication IF 2, and does not perform the process in the power saving state. The response processing unit 103 performs, in place of the first processing unit 101 or the second processing unit 102, a response process on a packet received via the communication IF 1 or via the communication IF 2 in a case where the first processing unit 101 and the second processing unit 102 are in the power saving state. The response processing unit 103 includes a storage unit 113 (an example of a second storage unit). The storage unit 113 stores information indicating processes to be performed on received packets in accordance with the destinations of the respective packets. The selection unit 104 selects the second processing unit 102 as the transmission destination of a packet received via the communication IF 2 in a case where the second processing unit 102 is in the normal state, and selects the first processing unit 101 as the transmission destination of the packet in a case where the second processing unit 102 is in the power saving state.

In the configuration illustrated in FIG. 3, the MAC 73A is an example of the first processing unit 101. The MAC 73B is an example of the second processing unit 102. The LSI 72A is an example of the response processing unit 103. The selector 74 is an example of the selection unit 104.

Exemplary embodiments of the present invention are not limited to the exemplary embodiment described above, and various modifications are possible. Some of the modifications will be described below. Two or more of the modifications described below may be combined and used.

First Modification

The configuration of the communication unit 17 is not limited to that illustrated in FIG. 3. The communication unit 17 may include a memory that stores packets received via the communication IF, for example.

Figure 12:
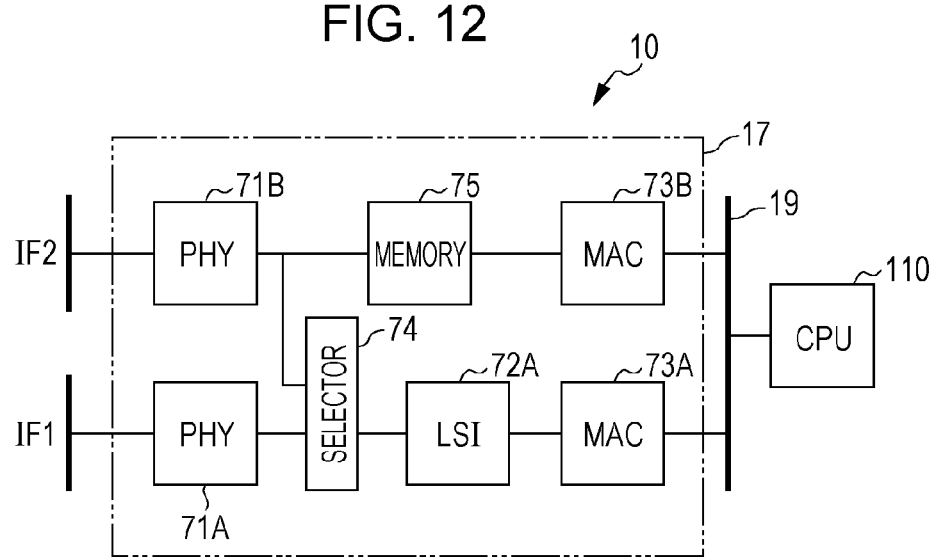
FIG. 12 is a diagram illustrating a configuration of the communication unit according to a first modification.

FIG. 12 is a diagram illustrating a configuration of the communication unit 17 according to a first modification. In FIG. 12, the communication unit 17 includes a memory 75 in addition to the configuration illustrated in FIG. 3. The memory 75 is a first-in first-out memory that stores packets received via the communication IF 2, and is provided between the PHY 71B and the MAC 73B.

Figure 13A:
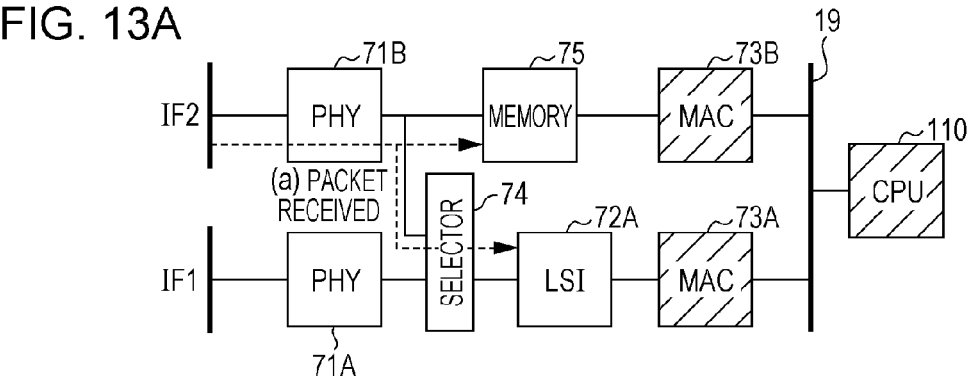
FIG. 13A is a diagram for describing operations of the units when a return-from-power-saving operation is performed in the first modification.
Figure 13B:
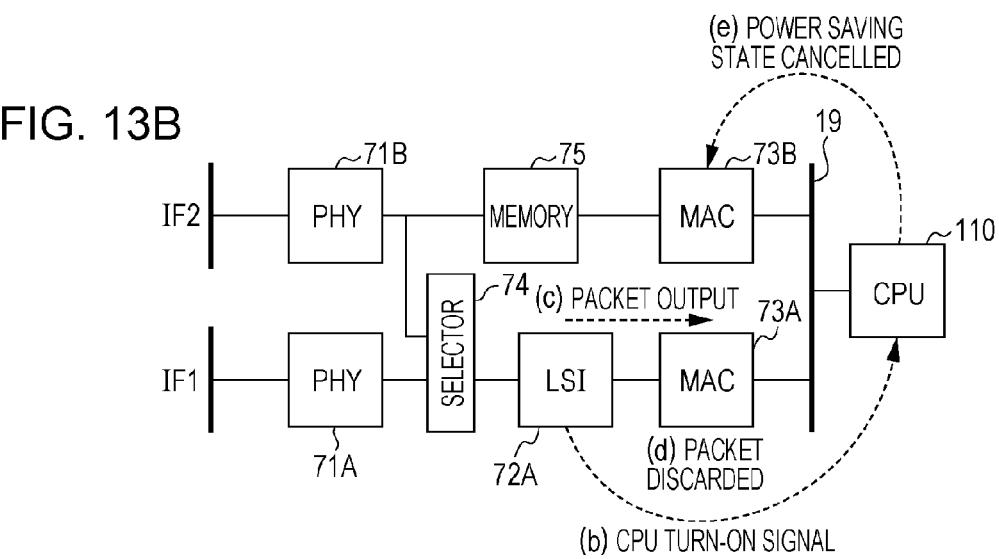
FIG. 13B is a diagram for describing operations of the units when a return-from-power-saving operation is performed in the first modification.
Figure 13C:
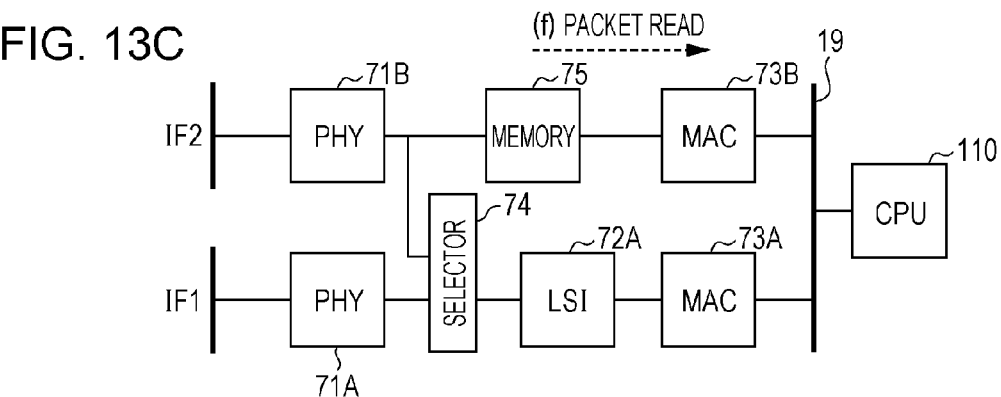
FIG. 13C is a diagram for describing operations of the units when a return-from-power-saving operation is performed in the first modification.

FIGS. 13A to 13C are diagrams for describing operations of the units of the image forming apparatus 10 when the LSI 72A performs a return-from-power-saving operation in the first modification. FIGS. 13A to 13C illustrate a series of operations to be performed when a packet destined for the MAC 73B is received via the communication IF 2, and the operations are similar to those illustrated in FIG. 9 in that the power saving state of the MAC 73B is cancelled in addition to those of the CPU 110 and the MAC 73A. In FIG. 13A, an operation ((a) in FIG. 13A) of storing a packet received via the communication IF 2 in the memory 75 is performed in addition to the operations illustrated in FIG. 9. In the first modification, when the MAC 73B has transitioned from the power saving state to the normal state, the MAC 73B reads the packet stored in the memory 75 ((f) in FIG. 13C). As illustrated in FIG. 13C, the MAC 73B reads the packet from the memory 75 instead of waiting for a packet that is identical to the discarded packet and that is destined for the MAC 73B to be retransmitted from an external apparatus. Therefore, according to the first modification, even in a case where retransmission of a packet is not assured (for example, in a case where the IP address, which indicates the destination, is a broadcast address when Simple Network Management Protocol (SNMP) or the like is applied), the MAC 73B is able to obtain the packet.

Figure 14:
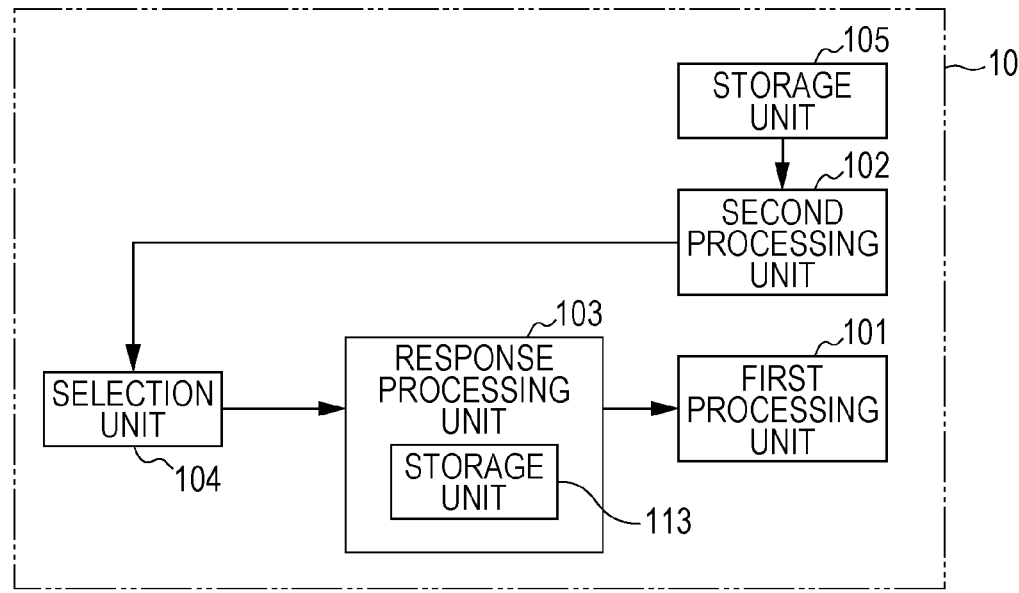
FIG. 14 is a block diagram illustrating a functional configuration of the image forming apparatus according to the first modification.

FIG. 14 is a block diagram illustrating a functional configuration of the image forming apparatus 10 according to the first modification. In FIG. 14, the image forming apparatus 10 includes a storage unit 105 (an example of a first storage unit) in addition to the configuration illustrated in FIG. 11. The storage unit 105 stores packets received via the communication IF 2. When the second processing unit 102 has transitioned from the power saving state to the normal state, the second processing unit 102 reads a packet from the storage unit 105. In the configuration illustrated in FIG. 12, the memory 75 is an example of the storage unit 105.

Second Modification

The exemplary embodiment of the present invention need not be applied to a single information processing apparatus, and may be applied to an information processing system.

Figure 15:
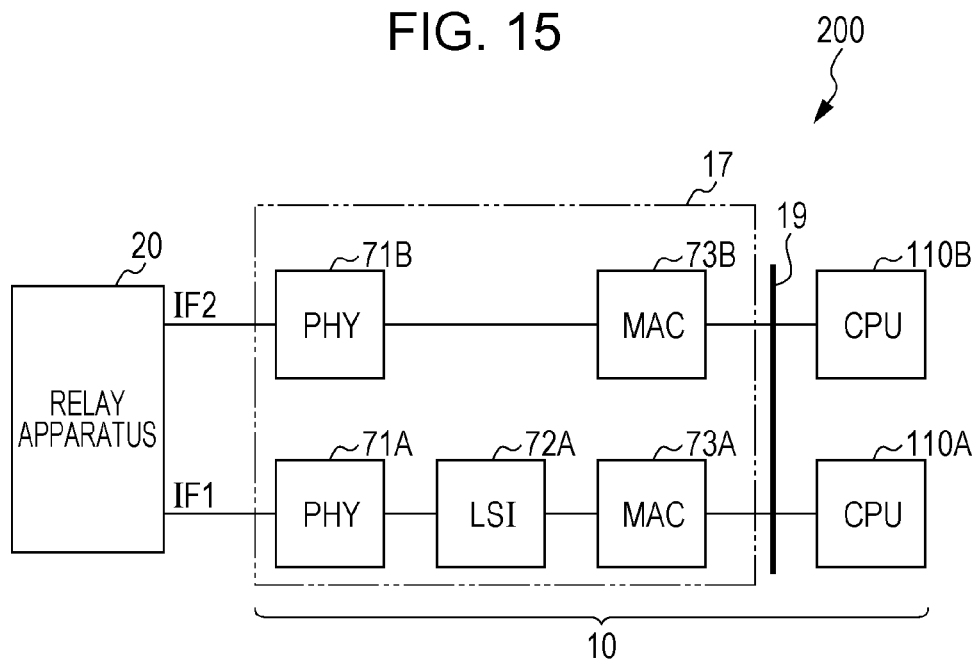
FIG. 15 is a diagram illustrating a configuration of an information processing system according to a second modification.

FIG. 15 is a diagram illustrating a configuration of an information processing system 200 according to a second modification. In FIG. 15, the information processing system 200 includes the image forming apparatus 10 and a relay apparatus 20. In FIG. 15, the configuration of the image forming apparatus 10 is different from that illustrated in FIG. 3 in that the image forming apparatus 10 includes two CPUs 110 (CPU 110A and CPU 110B) and in that the image forming apparatus 10 does not include the selector 74. In this modification, the CPU 110A controls operations of the MAC 73A, and the CPU 110B controls operations of the MAC 73B. The relay apparatus 20 is a switching hub that relays packets received via a communication line not illustrated to the image forming apparatus 10. In the information processing system 200, the relay apparatus 20 is used in place of the selector 74.

The relay apparatus 20 is connected to the PHY 71A and to the PHY 71B via individual communication lines and has a function of selecting the transmission destination of a received packet. Specifically, the relay apparatus 20 selects the MAC 73B as the transmission destination of a packet that is destined for the MAC 73B in a case where the MAC 73B is in the normal state, and selects the MAC 73A as the transmission destination of the packet in a case where the MAC 73B is in the power saving state. The transmission destination of a packet that is destined for the MAC 73A is always the LSI 72A.

Figure 16A:
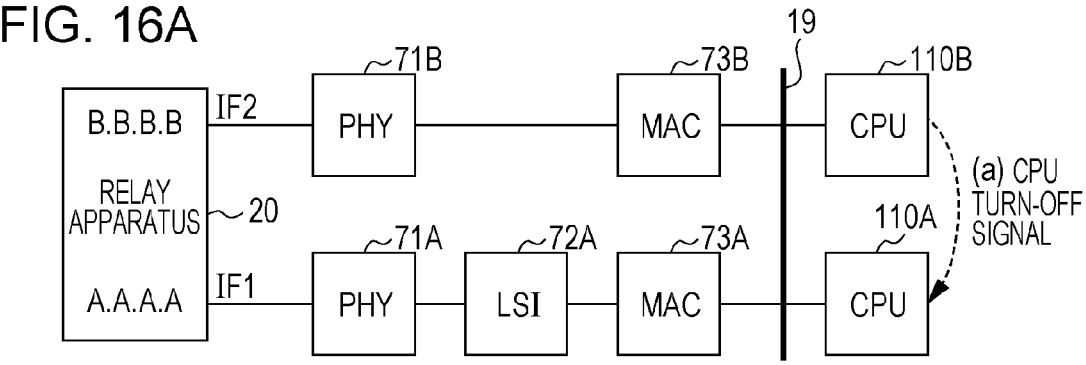
FIG. 16A is a diagram for describing operations performed in the information processing system.
Figure 16B:
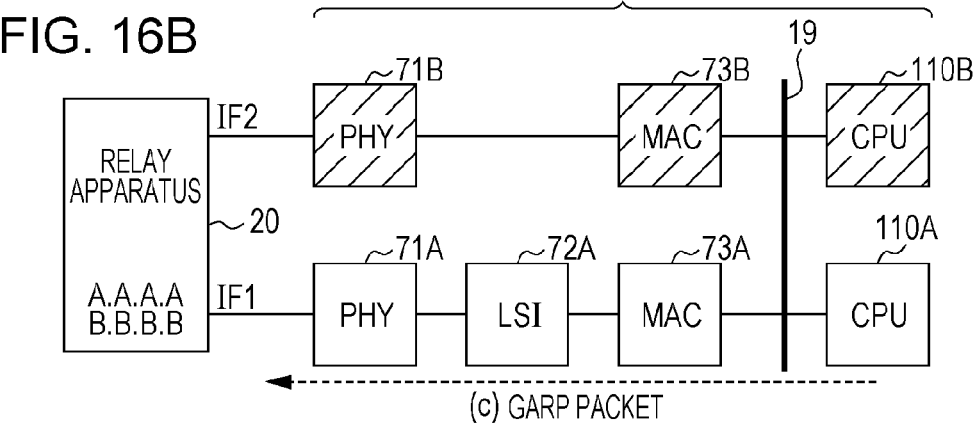
FIG. 16B is a diagram for describing operations performed in the information processing system.
Figure 16C:
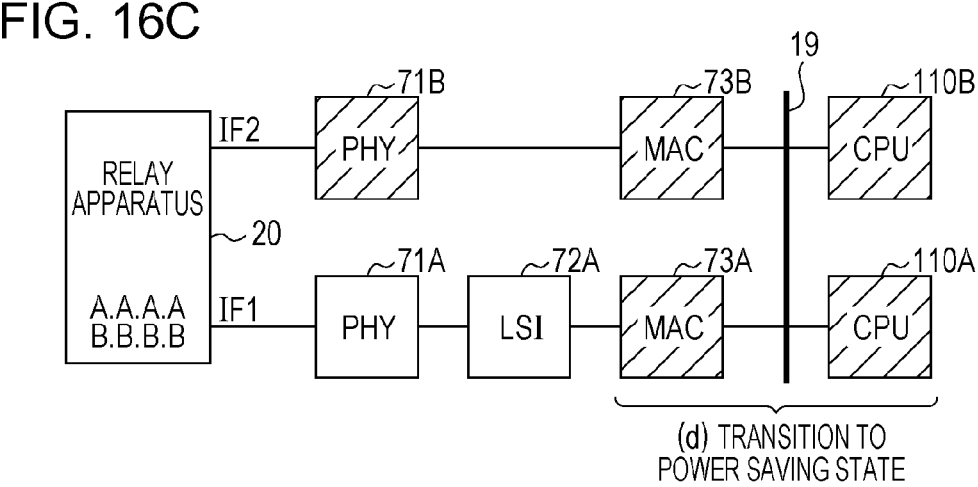
FIG. 16C is a diagram for describing operations performed in the information processing system.

FIGS. 16A to 16C are diagrams for describing a series of operations to be performed in the information processing system 200 when the CPU 110A and the CPU 110B transition from the normal state to the power saving state. If a power saving condition is satisfied, the CPU 110A and the CPU 110B change the operation states of the MAC 73A and the MAC 73B from the normal state to the power saving state and also change their operation states from the normal state to the power saving state, as in the exemplary embodiment. Note that, in the relay apparatus 20, a table (hereinafter referred to as "address table") that includes the destinations of packets (IP addresses) and the transmission destinations of the packets, which are associated with each other in advance, is stored. In the example illustrated in FIG. 16A, in the address table in the initial state, the IP address "A.A.A.A" is associated with the MAC 73A, and the IP address "B.B.B.B" is associated with the MAC 73B. In FIGS. 16A to 16C, IP addresses that appear in the block corresponding to the relay apparatus 20 represent information in the address table. An IP address that appears in the upper portion of the block indicates that the IP address is associated with the MAC 73B, and an IP address that appears in the lower portion of the block indicates that the IP address is associated with the MAC 73A.

In FIG. 16A, if a power saving condition is satisfied, the CPU 110B outputs, to the CPU 110A, a signal (hereinafter referred to as "CPU turn-off signal") for changing the operation state of the CPU 110A from the normal state to the power saving state ((a) in FIG. 16A). After the CPU 110B has output the CPU turn-off signal, the CPU 110B changes the operation states of the PHY 71B, the MAC 73B, and the CPU 110B from the normal state to the power saving state ((b) in FIG. 16B).

When the CPU 110A has received the CPU turn-off signal, the CPU 110A rewrites the address table stored in the relay apparatus 20. Specifically, the CPU 110A transmits a Gratuitous Address Resolution Protocol (GARP) packet to the relay apparatus 20 to thereby associate the IP address "B.B.B.B" in the address table with the MAC 73A ((c) in FIG. 16B). In a case where a packet where the IP address is "B.B.B.B" or "B.B.B.255", namely, a packet destined for the MAC 73B, is received by the relay apparatus 20 in this state, the MAC 73A is selected as the transmission destination of the packet. After the CPU 110A has transmitted the GARP packet, the CPU 110A switches the operation mode of the LSI 72A from the pass-through mode to the standby response mode and changes the operation states of the MAC 73A and the CPU 110A from the normal state to the power saving state ((d) in FIG. 16C).

Figure 17A:
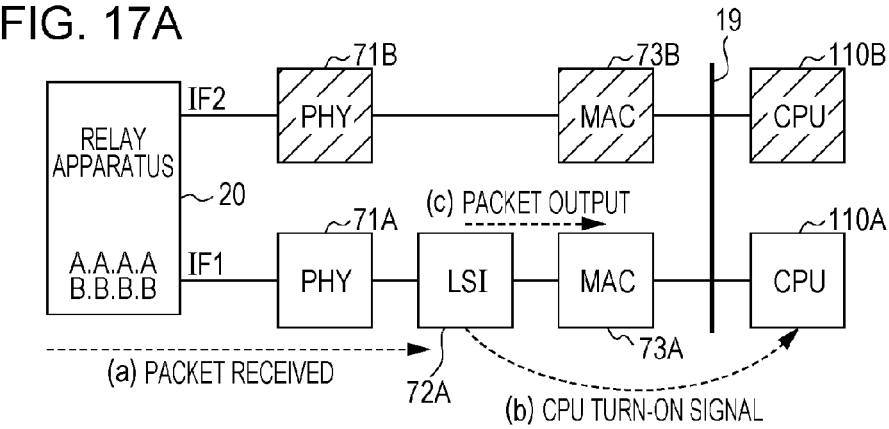
FIG. 17A is a diagram for describing operations performed in the information processing system.
Figure 17B:
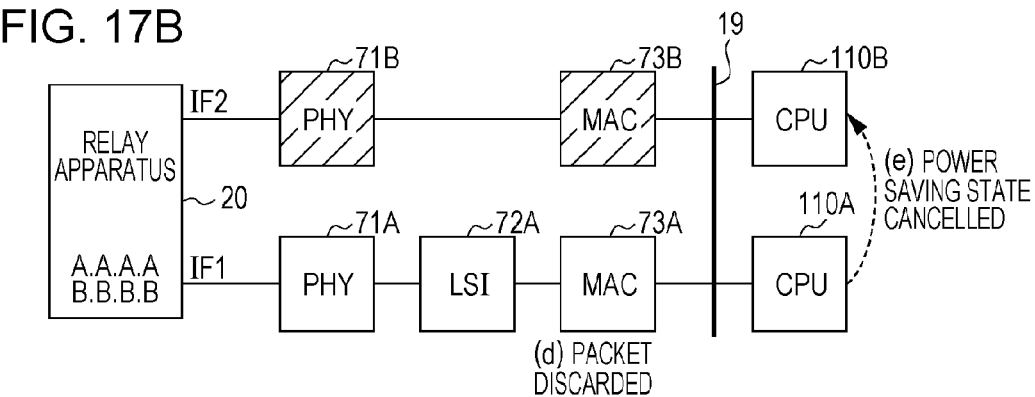
FIG. 17B is a diagram for describing operations performed in the information processing system.
Figure 17C:
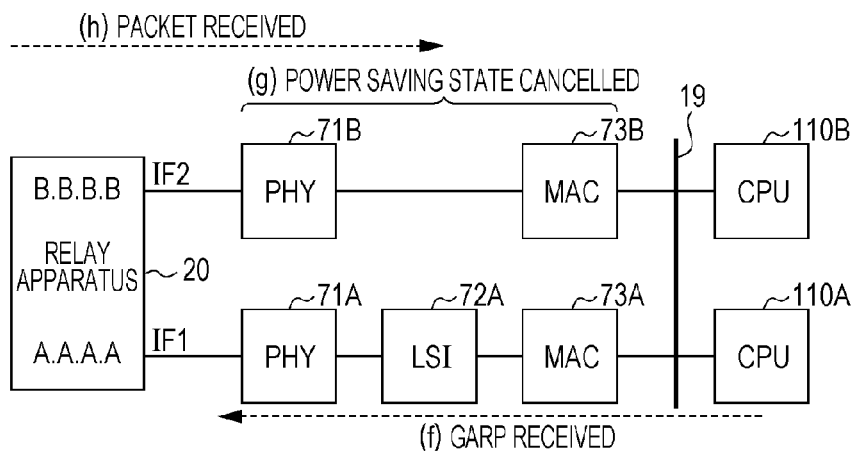
FIG. 17C is a diagram for describing operations performed in the information processing system.

FIGS. 17A to 17C are diagrams for describing a series of operations to be performed in the information processing system 200 when the LSI 72A performs a return-from-power-saving operation in the standby response mode. In FIGS. 17A to 17C, operations of the units to be performed when a packet destined for the MAC 73B is received by the relay apparatus 20 are illustrated. In FIG. 17A, a process similar to that illustrated in FIG. 8 is performed first, and the power saving states of the CPU 110A and the MAC 73A are cancelled. The LSI 72A that has been switched to the pass-through mode outputs a packet stored in the memory area to the MAC 73A ((a) to (c) in FIG. 17A). Next, the packet is discarded by the MAC 73A as in FIG. 9 ((d) in FIG. 17B), and a packet discard signal is output from the MAC 73A to the CPU 110A. When the CPU 110A has received the packet discard signal, the CPU 110A cancels the power saving state of the CPU 110B ((e) in FIG. 17B).

When the CPU 110A has received the packet discard signal, the CPU 110A rewrites the address table stored in the relay apparatus 20. Specifically, the CPU 110A transmits a GARP packet to the relay apparatus 20 to thereby associate the IP address "B.B.B.B" in the address table with the MAC 73B ((f) in FIG. 17C). In a case where a packet destined for the MAC 73B has been received by the relay apparatus 20 in this state, the MAC 73B is selected as the transmission destination of the packet.

After the CPU 110B has transitioned to the normal state, the CPU 110B cancels the power saving states of the MAC 73B and the PHY 71B ((g) in FIG. 17C). After the MAC 73B has transitioned to the normal state, the MAC 73B waits for a packet that is identical to the discarded packet and that is destined for the MAC 73B to be retransmitted from an external apparatus via the relay apparatus 20. When the MAC 73B has received a retransmitted packet destined for the MAC 73B ((h) in FIG. 17C), the MAC 73B processes the packet. Note that, in the second modification, the communication unit 17 may include the memory 75 as in the exemplary embodiment.

Figure 18:
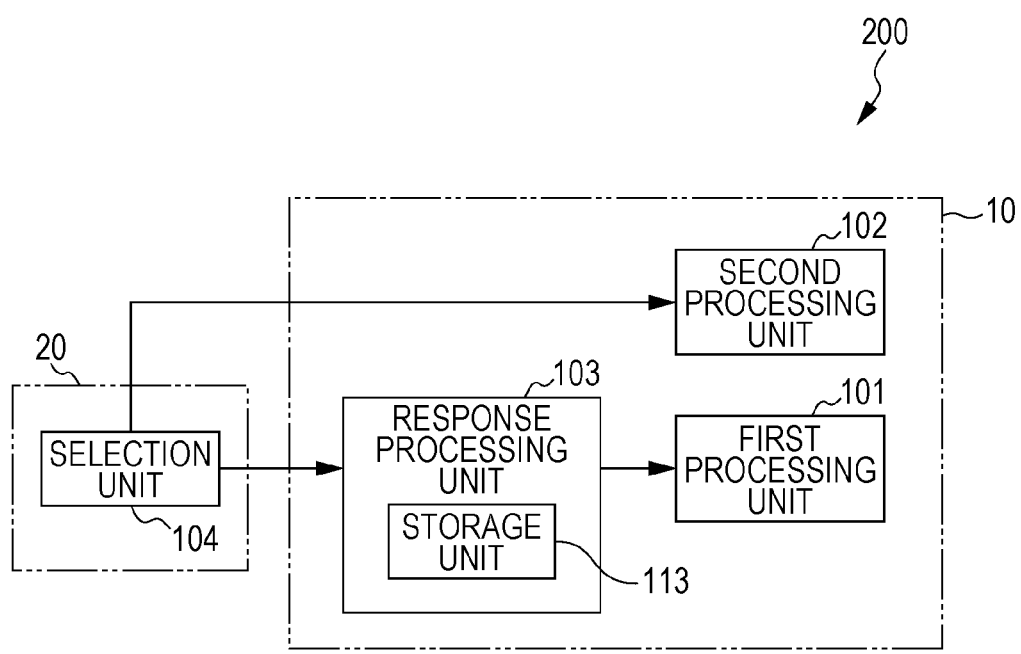
FIG. 18 is a block diagram illustrating a functional configuration of the information processing system.

FIG. 18 is a block diagram illustrating a functional configuration of the information processing system 200. The image forming apparatus 10 includes the first processing unit 101, the second processing unit 102, and the response processing unit 103. The relay apparatus 20 includes the selection unit 104. In the information processing system 200, the selection unit 104 selects the second processing unit 102 as the transmission destination of a packet that is destined for the second processing unit 102 in a case where the second processing unit 102 is in the normal state, and selects the first processing unit 101 as the transmission destination of the packet in a case where the second processing unit 102 is in the power saving state. The response processing unit 103 is connected to the communication IF 1. The information processing system 200 is configured similarly as in the exemplary embodiment except for the above-described operations.

Third Modification

The LSI 72A need not store, in the memory area, the identification number of a record referred to in order to process a packet in the standby response mode. In this case, when the CPU 110 has received a packet discard signal from the MAC 73A, the CPU 110 changes the operation state of an MAC other than the MAC 73A (the MAC 73B in the exemplary embodiment) from the power saving state to the normal state.

Fourth Modification

The exemplary embodiment of the present invention may be applied to an information processing apparatus other than the image forming apparatus 10. For example, the exemplary embodiment of the present invention may be applied to an image processing apparatus that performs image processing on image data.

Other Modifications

The configuration of the image forming apparatus 10 is not limited to that illustrated in FIG. 1. The configuration of the communication unit 17 is not limited to that illustrated in FIG. 3. For example, the communication unit 17 may function as three or more communication IFs.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a first processing unit that performs, in a first state, a predetermined process on data received via a first communication interface and that does not perform the process in a second state;
    a second processing unit that performs, in the first state, a predetermined process on data received via a second communication interface and that does not perform the process in the second state;
    a response processing unit that performs a response process in place of the first processing unit on the data received via the first communication interface or in place of the second processing unit on the data received via the second communication interface in a case where the first processing unit and the second processing unit are in the second state; and
    a selection unit that selects the second processing unit as a transmission destination of the data received via the second communication interface in a case where the second processing unit is in the first state and that selects the response processing unit as the transmission destination of the data in a case where the second processing unit is in the second state.

2. The information processing apparatus according to claim 1, further comprising:
    a first storage unit that stores the data received via the second communication interface, wherein
    the second processing unit reads the data from the first storage unit and processes the data in a case where the second processing unit has transitioned from the second state to the first state.

3. The information processing apparatus according to claim 1, wherein
    the response processing unit
    includes a second storage unit that stores information which indicates a process to be performed on data destined for the first processing unit and a process to be performed on data destined for the second processing unit, and
    performs the response process in accordance with the information stored in the second storage unit in a case where the first processing unit is in the second state.

4. The information processing apparatus according to claim 2, wherein
    the response processing unit
    includes a second storage unit that stores information which indicates a process to be performed on data destined for the first processing unit and a process to be performed on data destined for the second processing unit, and
    performs the response process in accordance with the information stored in the second storage unit in a case where the first processing unit is in the second state.

5. The information processing apparatus according to claim 1, wherein
    the second state is a power saving state where power consumption is smaller than in the first state.

6. An information processing apparatus comprising:
    a first processing unit that performs, in a first state, a predetermined process on data received via a first communication interface and that does not perform the process in a second state;
    a second processing unit that performs, in the first state, a predetermined process on data received via a second communication interface and that does not perform the process in the second state; and
    a response processing unit that performs a response process in place of the first processing unit on the data received via the first communication interface or in place of the second processing unit on the data received via the second communication interface in a case where the first processing unit and the second processing unit are in the second state, wherein
    the second processing unit performs the predetermined process on the data received via the second communication interface in a case where the second processing unit is in the first state, and
    the response processing unit performs the response process on the data in place of the second processing unit in a case where the second processing unit is in the second state.

7. An information processing apparatus comprising:
    a first processing unit that performs, in a first state, a predetermined process on data received via a first communication interface and that does not perform the process in a second state;
    a second processing unit that performs, in the first state, a predetermined process on data received via a second communication interface and that does not perform the process in the second state; and
    a response processing unit that performs a response process in place of the first processing unit on the data received via the first communication interface or in place of the second processing unit on the data received via the second communication interface in a case where the first processing unit and the second processing unit are in the second state, wherein
    in a case where the first processing unit and the second processing unit are in the first state, the first processing unit processes the data received via the first communication interface, and the second processing unit processes the data received via the second communication interface, and
    in a case where the first processing unit and the second processing unit are in the second state, the response processing unit processes the data received via the first communication interface and the data received via the second communication interface.

* * * * *